US008095496B2

(12) United States Patent
Gerber et al.

(10) Patent No.: US 8,095,496 B2
(45) Date of Patent: Jan. 10, 2012

(54) GENERIC AI ARCHITECTURE FOR A MULTI-AGENT SYSTEM

(75) Inventors: Andreas Gerber, Pirmasens (DE); Gero Vierke, Saarbrucken (DE); Christian Gerber, SaarBrucken (DE); Markus Wilhelm, Sulzbach/Saar (DE); Tobias Schild, Volklingen (DE)

(73) Assignee: X-aitment GmbH, Quierschied (DE)

( * ) Notice: Subject to any disclaimer, the term of this patent is extended or adjusted under 35 U.S.C. 154(b) by 730 days.

(21) Appl. No.: 11/996,830

(22) PCT Filed: Jul. 28, 2006

(86) PCT No.: PCT/EP2006/007527
§ 371 (c)(1),
(2), (4) Date: Jul. 18, 2008

(87) PCT Pub. No.: WO2007/012499
PCT Pub. Date: Feb. 1, 2007

(65) Prior Publication Data
US 2009/0204563 A1 Aug. 13, 2009

(30) Foreign Application Priority Data
Jul. 28, 2005 (DE) .......................... 10 2005 035 903

(51) Int. Cl.
G06F 17/00 (2006.01)
G06N 7/00 (2006.01)
G06N 7/08 (2006.01)
(52) U.S. Cl. ........................................................ 706/53
(58) Field of Classification Search ...................... 706/53
See application file for complete search history.

(56) References Cited

U.S. PATENT DOCUMENTS
7,668,621 B2 * 2/2010 Bruemmer .................... 700/245
(Continued)

FOREIGN PATENT DOCUMENTS
WO WO 2004086208 10/2004

OTHER PUBLICATIONS

Automatic recognition of prosodic phrases, Wightman, C.W.; Ostendorf, M.; Acoustics, Speech, and Signal Processing, 1991. ICASSP-91., 1991 International Conference on Digital Object Identifier: 10.1109/ICASSP.1991.150341 Publication Year: 1991, pp. 321-324 vol. 1.*

(Continued)

Primary Examiner — Michael B Holmes
(74) Attorney, Agent, or Firm — IPXLAW Group LLP; Claude A. S. Hamrick

(57) ABSTRACT

The invention relates to architecture of a computer program in order to implement a multi-agent system. The architecture enables the agents to interact with a simulation or game world on a first plane and/or with robots in the real world. Said architecture has a second and third plane. Said second plane contains an abstract representation of the simulation world on the first plane which reduces on concepts. Said third plane implements the agents of the multi-agent system. Interfaces are only arranged between the first and second plane, and between the second and third plane, not, however, between the first and the third plane. The artificial intelligence of the agents is implemented on the second and third planes such that the simulation world of the first plane can be widened, which leads to artificial intelligence. As a result, the architecture provides a KI-middleware for, for example, computer games.

16 Claims, 10 Drawing Sheets

U.S. PATENT DOCUMENTS

| | | | | |
|---|---|---|---|---|
| 7,693,836 B2* | 4/2010 | Brave et al. | | 707/603 |
| 7,698,270 B2* | 4/2010 | Brave et al. | | 707/603 |
| 7,702,690 B2* | 4/2010 | Brave et al. | | 707/776 |
| 7,721,336 B1* | 5/2010 | Adjaoute | | 726/25 |
| 7,788,109 B2* | 8/2010 | Jakobson et al. | | 705/1.1 |
| 7,801,644 B2* | 9/2010 | Bruemmer et al. | | 700/249 |
| 7,856,446 B2* | 12/2010 | Brave et al. | | 707/776 |
| 7,870,153 B2* | 1/2011 | Croft et al. | | 707/781 |
| 7,899,915 B2* | 3/2011 | Reisman | | 709/228 |
| 7,949,677 B2* | 5/2011 | Croft et al. | | 707/781 |
| 7,954,150 B2* | 5/2011 | Croft et al. | | 726/21 |
| 2005/0071306 A1 | 3/2005 | Kruszewski et al. | | |

OTHER PUBLICATIONS

QTIP: multi-agent NLP and privacy architecture for information retrieval in usable Web privacy software, Keselj, V.; Jutla, D.; Web Intelligence, 2005. Proceedings. The 2005 IEEE/WIC/ACM International Conference on Digital Object Identifier: 10.1109/WI.2005.124 Publication Year: 2005, pp. 718-724.*

Concept Based Search Using LSI and Automatic Keyphrase Extraction, Rodrigues, R.; Asnani, K.; Emerging Trends in Engineering and Technology (ICETET), 2010 3rd International Conference on Digital Object Identifier: 10.1109/ICETET.2010.100 Publication Year: 2010, pp. 573-577.*

Effective object-based image retrieval using higher-level visual representation, El Sayad, I.; Martinet, J.; Urruty, T.; Amir, S.; Djeraba, C.; Machine and Web Intelligence (ICMWI), 2010 International Conference on Digital Object Identifier: 10.1109/ICMWI.2010.5648110 Publication Year: 2010, pp. 218-224.*

"Virtools: Making 'Making Games' Fun Again," May 21, 2004 (http:greggman.com/games/virtools-review.htm); Oct. 25, 2006 12 pages.

Muller, "The Design of Intelligent Agents. A Layered Approach," Spinger Verlag, Berlin, Germany (Feb. 1999), 11 pages.

* cited by examiner

GENERIC AI ARCHITECTURE FOR A MULTI-AGENT SYSTEM

CROSS REFERENCE TO RELATED APPLICATIONS

This application claims priority to PCT/EP2006/007527, filed Jul. 28, 2006, which claimed priority to German Patent Application No. 10 2005 035 903.5, filed Jul. 28, 2005, the specifications and drawings of which are incorporated herein by reference.

This application is also related to German Patent Application No. 10 2005 035 909.4, filed Jul. 28, 2005 and WO 2007/012498, filed Jul. 28, 2006 and German Patent Application No. 10 2005 035 908.6, filed Jul. 28, 2005 and WO 2007/012497, filed Jul. 28, 2006, the specifications and drawings of which are incorporated herein by reference.

FIELD OF THE INVENTION

Established simulation programs or computer games have very good graphics and simulation of the physically relevant effects, but only limited AI (AI=Artificial Intelligence) for the computer-controlled gamers (agents). While the graphics and physics in games have become continually more professional over the years, the implementation of AI has been accepted as a necessary evil.

PRIOR ART

The area of research for multi-agent systems and architectures is broad. In "The Design Of Intelligent Agents" [JPM99], Jörg Müller describes a series of different design and architecture approaches. In particular, the agent architecture InteRRaP is presented, in which the capabilities of an agent in the three areas "reactive behavior", "rational planning" and "cooperation" are modeled by layers. In InteRRaP, each layer has a dedicated knowledge base. The agent has an interface which it can use to act upon its virtual or real environment. Only the bottommost layer has access to the interface in this case. The other layers have to use the controller through the behavior layer in order to act upon the environment.

PROBLEM

The invention's problem is to simplify the use of artificial intelligence for simulations and computer games.

SOLUTION

This problem is solved by the inventions with the features of the independent claims. Advantageous developments of the invention are characterized in the subclaims. The wording of all the claims is hereby incorporated into the content of this description by means of reference. The invention also covers all useful and particularly all mentioned combinations of independent and/or dependent claims.

The development of a generic AI architecture (AI=Artificial Intelligence) has been motivated by the plight of current computer games in relation to their artificial intelligence for the computer-controlled gamers (agents). While the graphics and physics in games have become continually more professional over the years, the implementation of the AI has been accepted as a necessary evil.

In the areas of graphics and physics, game developers are already at a point at which graphics or physics middleware is part of good tone. By contrast, in the area of AI there are no overall concepts which relieve the game developer of programming a separate AI.

The generic AI architecture presented here is intended to be used to provide a platform which makes it very easy for the game developer to integrate an AI without having to grapple with the topic of AI in detail. The aim is to provide an AI engine which acts like another human gamer for a game developer. We have therefore set ourselves the aim of keeping the AI architecture (engine) as generic as possible. The architecture is intended to provide an environment for the agents within which they can interact. As we will see later, the generic architecture produces a metalevel for the game environment, so that an agent can be used in different games without having to consider the exact implementation in the game.

The invention solves the problem by proposing a processing unit for implementing multi-agent systems having means for implementing a first level, which represents a system. This level defines the computer game to be implemented, for example, and is therefore frequently also referred to as a game engine. In somewhat more general terms, the first level normally represents a simulation world. Alternatively, it may be the real world if the agents control robots. In general terms, the first level is a system which alters with time. It can be altered by actions. In addition, its state or alterations to its state can be perceived.

In addition, the processing unit contains means for implementing a second level which has a world server, which has an abstract representation, reduced to concepts, of the system from the first level. For example, the world server reduces objects in the system from the first level to a few parameters.

Between the first level (game engine) and the second level (world server) there is an interface.

Finally, the processing unit contains means for implementing a third level, which has means for implementing the agents in the multi-agent system (agent engine).

Between the second level (world server) and the third level (agent engine) there is also an interface, but not between the first and third levels. The second level (the world server) isolates the first level (the game or the game engine) from the agents.

This design allows heuristic treatment of virtual physical effects, by the world server, which allows a much more complex world to be simulated with higher processing efficiency. The architecture thus allows a much increased processing speed for simulation problems.

A suitable processing unit is, by way of example, a computer or computer system, a microcontroller, a DSP, an FPGA or similar or a plurality thereof in a network.

A suitable computer system is either a standalone computer or a network of computers, for example, an inhouse, closed network or else computers which are connected to one another via the Internet. In addition, the computer system may be provided by a client/server configuration, where parts of the invention take place on the server and others take place on a client.

Preferably, the interface for communication between the first level (game engine) and the second level (world server) has a structure which corresponds to the structure of an interface between the first level and a human user or gamer. That is to say, that for a simulation or a game, the AI middleware (that is to say the world server and the agents) or the inventive agents act(s) like other human gamers. There is no need for any complex adaptation of the game and no need for any separate programming of the AI.

To simplify the structure and increase the processing speed, the communication between the second and the third level using the interface takes place by means of actions and percepts. There is no need for any interchange going beyond this. In other words: the second level (the world server) encapsulates the data from the system from the first level (game engine) using actions and percepts from the point of view of the agents.

In this context, an action is understood to mean an interaction which is introduced into the system from the first level and can alter it.

A percept perceives the world. A percept allows an agent to request or perceive states of the world. Percepts simulate a human's senses, inter alia. Percepts have the advantage that they are self-contained data packets which are not tied to interface definitions.

So that an agent can receive or perceive a percept, it needs to have a suitable sensor. This simulates a sensory organ, for example, that is to say the ability to see or to hear, for example. Every agent is therefore usually assigned at least one prescribed virtual sensor, and the percepts are filtered to suit the respective sensors of the agent. In other words: the information available to the agents is filtered according to what the respective agents can perceive. This allows very realistic and flexible multi-agent systems to be implemented.

The problem is also solved by a processing unit which merely comprises the second and third levels and comprises the interfaces between the first and second levels and the second and third level. The first level already contains a system, which is not provided by the processing unit itself; the system from the first level is merely docked on to. Such a configuration may arise, by way of example, when the agents on the third level control robots in the real world. This configuration also arises when the second and third levels provide artificial intelligence for an already existing computer game in the first level.

The invention's problem is also solved by a simulator for a multi-agent system. The simulator has means for implementing a first level, which represents a system. It also has means for implementing a second level, which has an abstract representation, reduced to concepts, of the system from the first level. Finally, it also has means for implementing a third level, which has means for implementing the agents in the multi-agent system. The simulator has an interface for communication between the first and the second level, and an interface for communication between the second and the third level. The simulator may be implemented in either hardware or in software.

The invention's problem is also solved by an architecture or software architecture for implementing a multi-agent system. The architecture has a first level, which represents a system. It also has a second level, which has an abstract representation, reduced to concepts, of the system from the first level. Finally, it also has a third level, which has means for implementing the agents in the multi-agent system. An interface caters for the communication between the first and the second level. Another interface caters for the communication between the second and the third level.

The invention's problem is also solved by an architecture for a computer program or software architecture for implementing a multi-agent system. This merely comprises the second and third levels, and also comprises the interfaces between the first and second levels and the second and third levels. The first level already contains a system, which is not provided by the architecture itself; the system on the first level is merely docked on to.

The invention's problem is also solved by a piece of middleware for developing a computer program for implementing a multi-agent system. The middleware involves the software architecture described, but therefore does not contain the complete implementation or the entire game as middleware. In particular the system from the first level is not part of the middleware. The middleware is designed such that it complements it. The middleware therefore merely provides the second and third levels, which provide the agents' capabilities. This allows simulations or computer games to be extended by the AI capabilities of agents or allows these to be easily integrated during development. The middleware is therefore a tool or software tool for developing simulations or computer games.

The invention's problem is also solved by a method. The text below describes individual method steps in more detail. The steps do not necessarily have to be carried out in the stated order, and the method to be outlined may also have other steps which are not mentioned.

In line with the proposed method for implementing a multi-agent system, a first level is first of all implemented which represents a system. A second level is then implemented which has abstract representation, reduced to concepts, of the system from the first level. Finally, a third level is implemented which has means for implementing the agents in the multi-agent system.

Information is interchanged between the first and the second level and between the second and the third level, but not between the first and the third level.

The problem is also solved by a computer program which, when executed on a processing unit, a microcontroller, a DSP, FPGA or computer or on a plurality thereof in a network, executes the inventive method in one of its refinements.

The problem is also solved by a computer program having program code means in order to carry out the inventive method in one of its refinements when the program is executed on a processing unit, a microcontroller, DSP, FPGA or computer or on a plurality thereof in a network. In particular, the program code means may be instructions stored on a computer-readable data storage medium.

The problem is also solved by a data storage medium storing a data structure which, when loaded into a user and/or main memory of a processing unit, a microcontroller, DSP, FPGA or computer or a plurality thereof in a network, can execute the inventive method in one of its refinements.

The problem is also solved by a computer program product having program code means stored on a machine-readable storage medium in order to carry out the inventive method in one of its refinements when the program is executed on a processing unit, a microcontroller, DSP, FPGA or computer or on a plurality thereof in a network. In this context, a computer program product is understood to mean the program as a tradable product. In principle it may be in any form, for example, on paper or a computer-readable data storage medium, and can be distributed via a data transmission network, in particular.

Finally, the problem is solved by a modulated data signal which contains instructions for executing the inventive method in one of its refinements which (instructions) can be executed by a processing unit, a microcontroller, DSP, FPGA or computer or by a plurality thereof in a network.

A suitable computer system for executing the method is either a standalone computer or microcontroller, DSPs, or FPGAs, or a network of microcontrollers, DSPs, FPGAs or computers, for example, an inhouse, closed network or else computers which are connected to one another via the Internet. In addition, the computer system may be provided by a client/server configuration, with parts of the invention taking place on the server, and others taking place on a client.

Further details and features can be found in the description below of preferred exemplary embodiments in conjunction with the subclaims. In this context, the respective features can be implemented on their own or as a plurality in combination with one another. The possibilities for solving the problem are not limited to the exemplary embodiments.

The exemplary embodiments are shown schematically in the figures. In this case, the same reference numerals in the individual figures denote elements that are the same or have the same function or elements whose functions correspond to one another. Specifically:

1 LIST OF CONTENTS FOR THE DETAILED DESCRIPTION OF THE FIGURES

2 Overview of the Components
2.1 The Human Gamer
2.2 Game
    2.2.1 Interface between game and AI engine
2.3 World Server
    2.3.1 Action Manager
    2.3.2 Action Handler
    2.3.3 Event Manager
    2.3.4 Event Handler
    2.3.5 Percept Manager
    2.3.6 Percept Handler
    2.3.7 Percept Plugins
    2.3.8 Internal Clock
    2.3.9 World Representation
2.4 Agent Engine
    2.4.1 Agent
        2.4.1.1 X-Ait Agent Engine
        2.4.1.2 Knowledge base
3. The X-Ait Agent
    3.1 The Architecture of the X-Ait Agents
    3.2 The Preferred Modified InteRRaP Model of the X-Ait Agent
        3.2.1 Actions
        3.2.2 Speech Acts
        3.2.3 Percepts
        3.2.4 Percept InQueue
        3.2.5 Percept Distribution
        3.2.6 Cooperation level
        3.2.7 Local Planning Level
        3.2.8 Reactive level
        3.2.9 Local knowledge base
4. Flow of Data
    4.1 Send Actions to Game
    4.2 Send Speech Acts from One Agent to the Other
    4.3 Send an Event from the Game to the AI Engine
    4.4 Percept Request to the Game (Pull)—Case 1
    4.5 Percept Request to the Game (Pull)—Case 2
    4.6 Percept Request to the Game (Pull)—Case 3
5. Processing Time Control
    5.1 Global Processing Time Control
        5.1.1 Single-thread Environment
        5.1.2 Multi-thread Environment
    5.2 Local Processing Time Control
        5.2.1 Component Scheduler
        5.2.2 Scheduler FSM

2 OVERVIEW OF THE COMPONENTS

Figure 1:
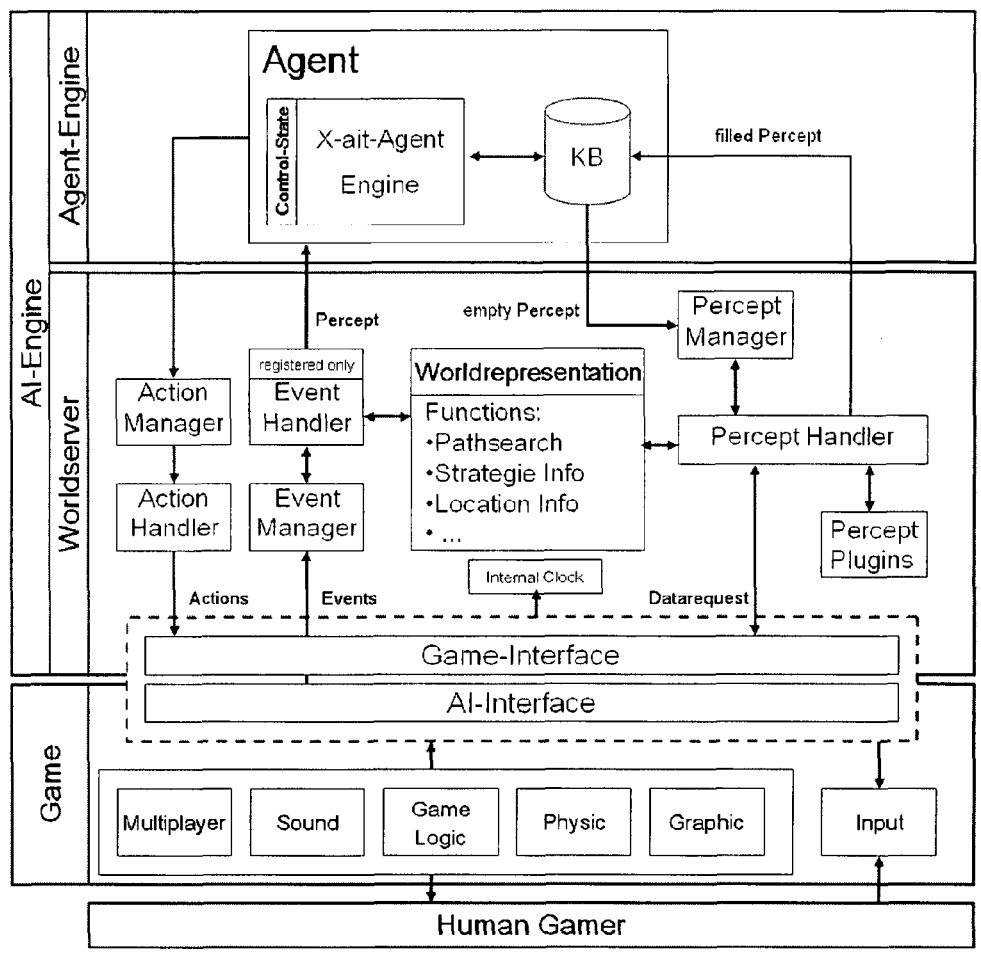
FIG. 1 shows an overview of the components in the AI engine.

FIG. 1 shows the general flow of data for the AI components and the game. So as not to keep data in redundant form, the world server isolates the game from the agents and encapsulates the data from the game engine using actions and percepts from the view of the agents. Thus, the development of the AI engine can be kept in isolation from the implementation of the game engine. The world server thus provides the agents with all the information about the game and keeps the data sources transparent for the agents, because the data required by the agents may either be buffered already in the global world representation or need to be read directly from the game engine. The aim of this is to allow the logic to be isolated into agents and data in the game. Only the action handlers and percept handlers access interface methods which need to be provided in the game engine. Together with the respective handlers, the actions and percepts provide the agents with a standardized interface for data and function calls to the game engine. Thus, in the case of an equivalent game (same genre), the implementation of the agents can be reused 100% and only the interface methods within the game engine need to be implemented so that they can execute the very simply woven actions and the data requests. The data requests are another form of the percepts.

The interface between the game and the world server or agent has been designed such that it matches the inputs and outputs of a human gamer in principle. This can be seen in FIG. 1 from the flow of data from the AI interface toward the game and that from a human gamer.

2.1 The Human Gamer

If one considers the human gamer, he has a very limited interface in order to manipulate the game progression. This is essentially limited to his available input devices (keyboard, mouse, joystick). So that the game can provide the gamer with feedback about his actions, there are output devices such as a monitor and sound output. These things are enough for the gamer to be able to take sufficient information from the game in order to control the game progression successfully. We will also use this approach in the AI engine, as will be seen later.

2.2 Game

The game, comprising a wide variety of components, such as graphics, sound, physics, etc., is not explained in more detail here. The crucial part within the game is the AI interface. This allows the AI engine to communicate with the actual game and the components it contains.

2.2.1 Interface Between Game and AI Engine

The interface between the game and the AI engine has been modeled on the example of the human gamer. For this, we want to reduce the data to be interchanged to a minimum and refer only to information which a human gamer can also obtain or can pass on to the game.

The whole interface between the game and the AI engine is divided into two parts. First, there is the AI interface and secondly the game interface. A task which is performed in both interface parts is the conversion of IDs (identifiers). The game and the AI engine allocate different IDs for the same game object. Within the game there are IDs for moving game objects which are intended to be provided with artificial intelligence by the agent in the AI engine, which in turn has another ID. The various IDs allow a better arrangement of the agent's data structures. So that this proceeds transparently for the game and the AI engine, the established IDs within the actions, percepts and events are converted automatically in the interface. The handlers are responsible for the special cases (see below).

2.1.1.1 AI—Interface

The AI interface is part of the game and allows the game to send information to the AI engine. This includes sending events and initializing and also manipulating parameters for the AI engine. Events are generated by the game engine, for example, when a sound is played. An event contains only rudimentary information, such as who triggered the event and what event is involved. So that the AI engine can be provided with processing time, there is an update method which starts the flow of data from the AI engine to the game and also synchronizes the AI-internal game clock. The complete function reference for the AI interface can be found in section 6 (see below).

2.2.1.2 Game—Interface

The game interface is in the AI engine and allows the AI engine to communicate in the direction of the game. In this case, there are two main functions which are used for communication with the game:

PerformAction:
  Actions, which have been generated in the AI engine are sent to the game. An action is a message in the form of a C++ struct. This contains elementary commands such as "move left", "move right", "take", etc. These commands correspond to the actions which a human user or gamer who is making inputs using a keyboard, for example, can produce. They need to be able to be implemented by a game engine in the same way as inputs by a human gamer. This facilitates or allows the processing by the game engine. The PerformAction method does this by calling a callback function, defined for initializing the AI engine, in the game. This callback function now needs to implement the actions in the game world for a particular agent. The calls to the callback function are triggered by the game at a point defined by the game. Examples of actions and an appropriate callback function can be found in section 6.5.

RequestData:
  The RequestData function, like the PerformAction method, also uses a callback function in order to retrieve data from the game. The task of the function is to respond to or meet a data request from the AI engine to the game. This is meant to replace the monitor output which is missing in comparison with the human gamer. However, the requested data are oriented to the data types which are present in games so that no complicated conversions need to be performed.

2.3 World Server

The world server within the AI engine provides a certain level of abstraction between the actual game and the agents acting in it. The various agents are able to interact with the world server by means of actions and percepts. The world server receives actions and percepts from the agents and implements them such that the game can interpret the data correctly. This means that only the AI interface and possibly parts of the world server need to be adapted for different games so that an unchanged agent can interact with the game. The world server comprises various components which route the flow of data from the agent to the game engine and back.

2.3.1 Action Manager

The action manager undertakes the timing of actions which need to be channeled into the game. In this case, the action manager primarily comprises a queue which can receive actions and a one-to-one association which associates precisely one action handler with a particular type of action. Actions can be received by the action manager at any time from the agents. These are then first of all put into an FIFO queue. At regular intervals, the action manager is allocated time so that it can process the data in its queue. This time is determined by the game, since processing the actions results in callback calls within the game. When the action manager has now been provided with the time, it takes one action after the other from the queue and calls the appropriate action handler for the respective type of action, transferring the action to the action handler. The reference to the action is then removed from the queue and the next action is processed. This process does not end until the whole queue has been processed. In this case, there is no division into processing steps or processing time. This would result in the proportion of free processing time constantly being too small which would allow the queue to overflow. Completely processing the queue slows down the game to the extent that it can manage the inputs of the AI engine. This is similar to the principle of a multiplayer engine, which needs to handle all the data from the clients so that correct gameplay is accomplished. Since we would not always wish to load the relevant action handlers for all possible actions, the action manager has the option of registering individual action handlers for a certain action. When an agent wishes to send a certain action to the game, it needs to register for a certain action on the world server at the start (during its initialization). The world server then ensures that an appropriate action handler is created and is registered on the action manager for the requested action.

2.3.2 Action Handler

An action handler performs operations for a particular type of action. For each action handler, there may be just precisely one action which it is able to handle, but an action may have more than one action handler. There is therefore a 1-to-x relationship between action and action handler. This has the advantage that we can perform different post-processing operations in an action handler which adapt an action to suit the respective game. In this case, no new information can be introduced into the action, but the data which the action contains can be converted if necessary. The agent can therefore continue to send the actions which it knows without having to consider the variation in the game. One of the most frequent applications for the action handler is converting IDs. Thus, actions, for the IDs converted in the interface which are already present as standard, may contain further IDs about game objects. These likewise need to be converted so that the game can process the action correctly.

2.3.3 Event Manager

The event manager undertakes the timing for sending events to the AI engine. Like the action manager, it comprises a queue which can receive new events, and has an association between events and event handlers. In this case, again we have a 1-to-x relationship, since each event may have more than one event handler. This multiple relationship is stipulated as a one-to-one relationship during the AI engine's initialization phase.

In similar fashion to the case of the action manager, we do not always want to load the event handlers for all possible events. So that a particular agent can receive events from the game, it needs to notify the event manager of this. To this end, it registers on the world server for a certain event. This results in the world server creating a new event handler and registering it with the event manager. In addition, the agent is now also registered with the event manager for a certain event using its ID and its subID. In this context, the registration information of the agent is stored directly in the relevant event handler. The event handler requires this information so that for an incoming event it can send the resultant percept to the correct receiver. The aforementioned subID is an ID which addresses individual components within the agent. This bypasses further administration complexity for receiving percepts within the agent.

The event manager can pick up new events from the game at any time. However, these are stored in the FIFO queue until the world server allocates the event manager processing time, so that the event manager can process the events further. Once the event manager has processing control, it processes all the events in its queue. This prevents the queue from overflowing when there is still too little processing time available. To this end, it calls the appropriate event handler for each event and transfers the event to the event handler. In contrast to the action manager, the event is not deleted from the queue in all cases. Should the event handler not have finished processing the event, the rest of the processing of the event is deferred until the next call by virtue of the event remaining in the queue.

2.3.4 Event Handler

An event handler performs operations on a particular event. The task of the event handlers is to transform an event into a percept and to update the global world representation if this is required for an event. Each event handler has a list of agent IDs and associated subIDs for which it needs to produce percepts from the event. To this end, it takes the event and, in the first step, performs an update for the global world representation if this is necessary for the event. This may be a sound event, for example, which first of all needs to be propagated through the world so that it is possible to tell what agent is actually receiving this sound event. Since these calculations, in some cases, may last a very long time, longer than the AI engine has processing time available for a frame, a complex algorithm can interrupt the processing at a defined point and notify the event manager that it wishes to be called again for precisely this event. The event manager then defers the rest of the execution of the event processing to the next frame.

A frame is a single image of a simulation or of a computer game. Typically, the aim is to present the human user with approximately 25, 50 or more of these per second so that movements are fluent and not jerky. There are therefore approximately 10-40 ms available for calculating a frame.

If the world representation has now been updated, the event processing can be continued. Each agent component registered with the event handler now has a percept produced for it, and this is forwarded to the respective agent.

In addition to recopying the data from the event struct to a percept struct. the event handler can perform further operations. Thus, by way of example, for a sound event it can produce further information for the agent, such as the volume of the sound the latter receives if this has not already been done by the games engine. Furthermore, the task of converting IDs arises for IDs which go beyond the standard in the event struct. It is thus possible to condition the event in the event handler as desired, since another data structure, the percept, is forwarded.

2.3.5 Percept Manager

The percept manager undertakes the timing for sending percepts to the game engine. Like any other previously presented manager, the percept manager also has a FIFO queue which receives new percepts from the agent. So that the percepts can be processed, there is again an association table for percepts and percept handlers. Between percepts and percept handlers there is a 1-to-x relationship so it is possible to get to the information for a percept in different ways. During the initialization phase, the relevant percept handlers are stipulated so that a one-to-one relationship is obtained. Since we do not wish to load the relevant percept handlers for all possible percepts every time in this case either, we use the principle of registration in this case too. If an agent now wishes to make a percept request, it needs to register with the world server for the respective percepts. If there is not already a percept handler for the respective percept, a new percept handler is created in the world server which is then registered with the percept manager. Following registration, the agent can send percepts to the percept manager.

For processing the percepts in the FIFO queue, we distinguish between two processing steps. First, we have the FetchData step and secondly the ProcessData step. We have made this division in order to minimize the time during the synchronization between the game and the AI thread. In the FetchData step the percept handler will merely read data for processing the percept in the game. The read data are passed through to the percept manager, so that it can buffer store them for the ProcessData step. The percept manager performs this process for all the percepts in its queue without deleting the queue in doing so. When the FetchData step has been executed once for all percepts, this step is complete. The percept manager then returns processing control to the world server. The second step is a ProcessData step. During this step, the percept manager takes a respective percept with the associated data request from the queue and uses it to execute the appropriate percept handler with the ProcessData step. In this step, the percept handler can process the previously collected data and return them to the agent in a percept. In addition, the percept handler can notify the percept manager that it has not been able to conclude the processing of the percept in an appropriate time and wishes to be called again for the next ProcessData step. The percept manager remembers these percepts and does not perform another FetchData step for them next time. In the ProcessData step, all the percepts are processed until the queue is empty so that the queue does not overflow if there is too little processing time available for the AI engine.

2.3.6 Percept Handler

A percept handler is required in order to fill a certain percept with information from the game. It is therefore a general interface between the data formats of the agents and the game.

As already explained in the percept manager, there are two different processing steps which each percept handler needs to master. The first of these is the FetchData step. For this, the percept handler collects the information from the game which it needs in order to fill the percept with information. It obtains the data via what are known as the data request structs. These are sent to the game by the game interface and are filled with a callback function in the game. When a callback function has returned, the data request has been filled with valid data. The filled data requests are passed to the percept manager. This has the advantage that it is not necessary to store any percept-specific information in the percept handler. The percept handler is merely responsible for processing the percepts and therefore there is only one percept handler for all percepts of a type. When all the data have been requested from a game, the FetchData step is complete.

In the ProcessData processing step, the percept handler is firstly provided with the percept to be filled, and secondly with a set of data requests which it has previously collected in FetchData. The percept handler now uses these data to fill the percept. Should it require too long for the work, it can notify the percept manager that it wishes to be called again in the next pass. For processing the data, the percept handler can call in additional percept plugins and also the world representation. During the calculation the percept handler is subject to a level of detail (LOD) mechanism. In this case, the LOD is based on the priority of the respective agent which has requested the percept. Should the agent have low priority, the percept handler should avoid intensive processing operations. This can be explained using the example of Synthetic Vision (an agent's synthetic view of the virtual world) during a percept request. The percept plugin Synthetic Vision uses up a very large amount of processing time. In doing so, the plugin establishes the visible objects within an image. Alternatively, this can be approximated by directly asking the game engine what objects are situated within a defined visible area.

When the percept is filled completely after the calculations, it is returned to the agent which is cited as sender in the percept.

2.3.7 Percept Plugins

A percept plugin supports the percept handler in calculating the percepts. A percept plugin may be Synthetic Vision, for example, which extracts the visible objects from an image.

2.3.8 Internal Clock

The internal clock stores the current game clock. This is not to be confused with the system clock. There are a large number of games which have their own game clock so that they can implement slow motion.

2.3.9 World Representation

The world representation is used to abstract the game world for the agent. The data in the world representation can be obtained in an offline process, or as an online process during the game. One of the main tasks of the world representation is to store a navigation graph so that the agents can navigate in the virtual world. For the various genres of game, there are various forms of the world representation which can be actuated via a standard interface. Examples of these would firstly be the navigation mesh graph, which is frequently used in first-person shooters, and secondly a height map for navigation in realtime strategy games.

The world representation may also be used as a cache for information which does not always need to be taken from the game for all agents. This may be the position of certain objects, for example. In addition, it is possible to perform a proximity test efficiently in order to avoid collisions, for example, if the game does not already provide this.

2.4 Agent Engine

The agent engine symbolizes all the agents which are in the AI engine. The agent administration and also the processing time administration of the agents are implemented by the world server. At this point, the coarse constituents of an agent are explained only briefly (see FIG. 2). They are described accurately in section 3.

2.4.1 Agent

The agent comprises two main constituents. These are firstly the X-ait agent engine and secondly the knowledge base (KB).

2.4.1.1 X-Ait Agent Engine

The agent architecture models the flow of data in a cognitive environment. An accurate description of the individual components of the architecture follows in section 3.1.

2.4.1.2 Knowledge Base

The knowledge base (KB) provides each agent with its individual knowledge. As already mentioned, there is also again part of the world representation here. The X-ait agent engine obtains the majority of its knowledge directly from the knowledge base. Excluded from this are a few events which the agent has not been able to perceive, for example. The exact design of the knowledge base is likewise explained in the Agent section.

3. THE X-AIT AGENT 3.1 The Architecture of the X-Ait Agents

The X-ait agents (see FIG. 2) are a further development of the InteRRaP architecture, which comprises three levels in which each higher level has a higher level of abstraction than the lower one [JPM99]. In addition, the three levels are divided vertically into two modules: one module contains the knowledge base for each level and the other contains various control components which interact with the corresponding levels of the knowledge base. Vertically distributed over all levels is the local world representation, which contains all the 3D information (position of articles and agents, room layout, etc.).

The InteRRaP architecture has a world interface, i.e. an interface to the world. Technically, the world interface comprises a plurality of components. The agent interacts with the world exclusively by means of actions and percepts.

In the reactive level (behavior) of the InteRRaP architecture, what are known as the "behaviors" are programmed and stored. These are encapsulated behaviors and actions of the agent. Using the example of computer football, these would be elemental behaviors (atomic actions) of an agent or gamer, such as "run forward", "turn", "dribble with ball" and "shot at goal". The sequence of such single behaviors is initiated by spontaneous reaction in the course of the game, or a sequence of the atomic actions is firmly defined in what are known as scripts or as planned by the next highest level.

In the planning level, a typical function plan for each individual gamer is compiled from the elemental behaviors (atomic actions), i.e. a plan is a sequence of "elemental behaviors". One example of a plan might be, for example: <"run forward" "dribble with ball" "shot at goal">, which corresponds to a script.

In the cooperation level (cooperation) social plans are created; using the football example, this would be the interaction of the eleven players on a football team. Generally, these will be fixed plans, such as the interaction of the players through coordinated running behavior and passing play, with the aim of being successful at goal. The agent can thus give other agents instructions by instructing them to execute elemental behaviors.

The basis used for describing the actions, e.g. during the communication for the cooperation, is the ID stored by the planner for the relevant action. The description which the planner uses for the world and the actions which can be executed therein is the PDDL (Planning Domain Definition Language) standard (types, predicates, actions).

3.2 The Preferred Modified InteRRaP Model of the X-Ait Agent

The modified InteRRaP model has an optimized flow of data which makes it easier to interchange information between the various levels of the InteRRaP model. In the foreground, the model was to be made as flexible as possible so that the X-Ait agent can be of modular design and it is no longer necessary to manage the flow of data in the newly implemented modules. In the original InteRRaP model, each module needs to manage whether it reacts to an action or percept. This decision is either very easy to make, if it is assumed that certain actions and percepts can be processed only by individual levels, or very difficult, if already produced actions need to have their content altered when a lower level wishes to execute something. The new approach is oriented to targeted actions and percepts. If two levels are communicating with one another, they do this by means of percepts. Percepts have the advantage that they are self-contained data packets which are not tied to interface definitions. These are very fundamental percepts which goes without saying for a certain level within the InteRRaP. It is thus necessary, by way of example, for the reactive level to be able to understand a percept with a plan, since it is the definition of the relative level that it executes plans. One reason why we do not use a specific interface for internal communication is the fact that percepts allow better control of the processing time. When a percept is sent from one level to another, this percept needs to go through the percept queue. However, this queue is only emptied for each frame. There is thus automatically a suspend between the percept being filled in the sender level and reception in the receiver level.

Another obvious change in the design of the individual components in comparison with the original InteRRaP model is the knowledge base. The common knowledge base provided by the framework (that is to say the generic AI architecture) now comprises only the local world representation and the percept memory. The local world representation is in this case a copy of the global world representation with individual changes. In addition, there is the percept memory. This stores percepts between and also makes percept requests to the AI world server when information in the memory is too old or is missing. The knowledge bases shown in the original InteRRaP for cooperation, local planning and reactive level still exist but are not provided by the framework. The knowledge bases are special implementations dependent on the respective module.

3.2.1 Actions

One of the elemental data structures which the agent can use to interact with its environment are the actions. An action describes an elemental control event, similar to a human pressing a key on the keyboard. An action always contains the following information:

Type of action (key press, mouse movement, text input, etc.) and

ID of the agent, wishing to perform the action.

The information which each action contains is also supplemented by an action-specific information. In the case of a "key press" action, this could be the pressed key.

Figure 2:
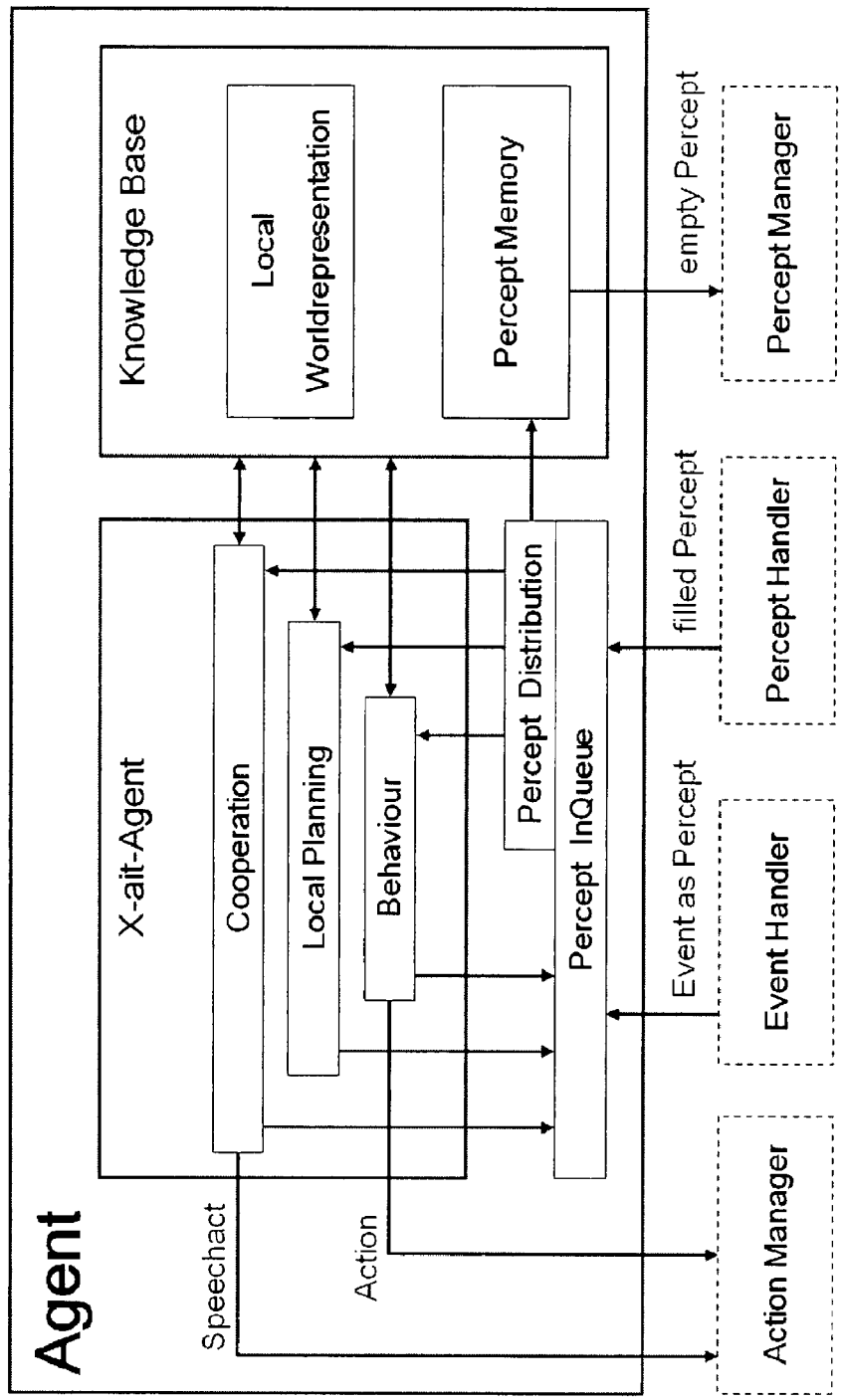
FIG. 2 shows a schematic model of an X-Ait agent.

Another main purpose of actions is to transmit speech acts. Speech acts are used for communication between the agents. These are always sent via the game, however, so that the game has full control over the communication between the agents. So that a further interface for the game is not required, the speech acts are sent to the game as an action and are sent from the game to the AI engine as an event for the target addressee. FIG. 2 shows this using the speech acts which are likewise sent to the action manager.

As shown in the diagram, actions are sent off only by the cooperation and reactive levels.

3.2.2 Speech Acts

Speech acts are very compact data structures which are interchanged between two communicating parties. A speech act is intended to remodel the communication between two humans. For this, one is first of all not tied down to one specific medium but rather the pure voice traffic between two humans is analyzed. From the analyses of this voice traffic and the additional need for information for administration by the framework, the following fundamental data are obtained which are preferably present in every speech act:

Type of speech act (instruction, information, etc.)

ID of the agent, which initiated this speech act (sender), and

ID of the agent which is intended to receive the speech act (receiver).

An identification marker which the receiver needs to use to respond to this request if this is necessary.

The identification marker which the sender expects when responding to a request.

This information is always required for communication. In addition, useful data are also required.

3.2.3 Percepts

The percepts are likewise very elemental data structures. These allow the agent to take information from the game world about the AI world server, or so that it can communicate within the agent. Percepts have—like actions—predefined fundamental information. This is preferably:

Type of percept (hearing, seeing, speech act, etc.)

ID of the agent which is intended to receive the percept, and

SubID of the component within an agent for which the percept is intended.

In addition to the fundamental information which is required for conveying and distributing the percepts through the framework, there is useful information which differs according to the percept.

3.2.4 Percept InQueue

The percept InQueue receives all incoming percepts. These may have been produced either externally or internally. The percept InQueue is a simple FIFO queue. This is processed fully each time an agent is provided with processing control. This is intended to prevent the queue from overflowing when too little processing time is available.

3.2.5 Percept Distribution

The percept distribution is an extension of the percept InQueue. This is responsible for the percepts in the queue being able to be forwarded to the relevant components (reaction, planning, cooperation). This process is triggered each time the agent is provided with processing time. In this case, the SubID within the percept is used to ascertain the relevant component of the agent and then the relevant handle method (processing method) of the component is called with the percept. The handle method of the component then processes the percept. This is continued until the queue is empty. In this context, none of the handle methods should create new percepts which are then in turn sent to the current agent. Should this nevertheless occur, new percepts which arrive while the queue is being processed are not considered in this step. This is achieved by not processing the queue until it is empty but rather by means of iteration via the queue until an end which is stipulated at the start of the process.

The SubIDs within an agent are split into a static area and into a dynamic area. The static area has a quick definition. These are the three main components of the agent, the cooperative level, planning level and the reactive level. In this regard, the classification is as follows:

0: reactive level
1: planning level
2: cooperative level

These SubIDs are static so that internal communication becomes possible in the first place. In addition, they are the same across all agents, which means that a cooperation level for one agent can communicate with the cooperation level of another agent.

All other SubIDs are allocated dynamically during the execution time. Possible components are, by way of example, other subcomponents within the reactive level, or parts of the percept memory, e.g. seeing, hearing, that is to say the five senses. These components manage with a dynamically allocated SubID, because they require it merely to request new data from the AI world server. These components do not communicate with other components within an agent or the components of another agent.

3.2.6 Cooperation Level

The cooperation level is the highest level in an agent modeled by InteRRaP. In it, the communication between two agents takes place. To this end, various communication protocols may be used in the communication level. One of the most frequently used protocols in this level is the known Contract Net Protocol. The cooperation component can send speech acts in the form of actions to other agents. To this end, the cooperation component only needs to know the ID of the other agent, since the cooperation component of each agent needs to register on the world server for speech acts and hence stores the relevant SubID, which is used as receiver ID, there.

The change in the flow of data in the preferred modified X-Ait agent means that the cooperation level can now also send plans to the reactive level directly via the percept InQueue. This has the advantage that the communication overhead for very simple agents which merely receive and execute commands is not large. In this respect, the preferred modified X-Ait agent is less processing intensive.

The normal task of the cooperation level is to communicate with other agents and finally, or during the communication, to send orders to the local planning level.

The communication within the agent works by means of percepts. For this, various percepts are available for communication between communication level and local planning and also communication level and reactive levels. These are:

Communication level<->Planning level:
  PerceptGoal: the planning is intended to produce a plan for a certain goal.
  PerceptGoalFB: for the response to a previously sent PerceptGoal. This contains whether or not the goal has been able to be implemented and reasons in the event of failure.
Communication level<->Reactive level:
  PerceptPlan: contains a plan which is intended to be implemented by the reactive level.
  PerceptPlanFB: this transmits the response to a previously transmitted PerceptPlan to the communication level from the reactive level. This percept contains whether the plan was successful or failed, and if it failed, in which plan step.

3.2.7 Local Planning Level

The local planning receives goals/tasks from the communication level and produces a possible plan therefrom. This plan is then sent to the reactive level for execution. For the planning level, no provision is made for it to be able to send actions. It is used as a planning tool between communication level and reactive level. To this end, it uses the same percepts as the communication level.

Planning level<->Communication level:
  PerceptGoal: contains a goal for which the planning level is intended to produce a plan.
  PerceptGoalFB: for the response to a previously sent PerceptGoal. This contains whether or not the goal has been able to be implemented, and if appropriate, the reasons for failure.
Planning level<->Reactive level:
  PerceptPlan: contains a plan which is intended to be implemented by the reactive level.
  PerceptPlanFB: this transmits the response to a previously transmitted PerceptPlan to the planning level from the reactive level. This percept contains whether the plan was successful or failed, and if it failed, in which plan step.

3.2.8 Reactive level

The reactive level is where the actual control of the agent takes place. It implements individual behaviors, which in turn produce control inputs for the game. The reactive level cannot make its own decisions. It can react to certain events with predefined behaviors, however. This would be the case, for example, if an opponent is sighted and a behavior then automatically targets it and shoots. The reactive level can communicate both with the communication level and with the planning level. This is dependent on who sent the current plan to the reactive level. The acceptance of new plans is made, as already described for the other two levels, by means of percepts. To this end, the reactive level needs to understand further the following percepts:

PerceptPlan: contains a plan which is intended to be implemented by the reactive level.
  PerceptPlanFB: this transmits the response to a previously transmitted PerceptPlan to the planning or communication level from the reactive level. This percept contains whether the plan was successful or failed, and if it failed, in which plan step.

3.2.9 Local Knowledge Base

The local knowledge base stores the knowledge which is available universally for all components of the X-Ait agent. In this regard, an attempt is made to put the data into a general form so that the knowledge can be used in every component without the need to understand complicated knowledge representations. Should a component require specific knowledge, this knowledge is created and managed within the component. On account of its general nature, the general knowledge base can be divided into two parts. This is firstly the knowledge about the landscape or geometry of the environment. This information is stored in the local world representation. This part of the knowledge base provides the agent with information about how its environment is designed and also provides it with the opportunity to start path searches for the environment. The local world representation is the same as a human's three-dimensional intellectual capacity. This allows him to find his way in his environment too. As a result, he recognizes whether he is in a room or in the open air, and how to get from A to B. The local world representation is a copy of the global world representation but may contain differences which have arisen as a result of the agent's experiences.

The second part of the knowledge base is the percept memory. The percept memory is a cache which buffer-stores percept requests. Since percepts contain factual knowledge, the percept memory is a form of factual knowledge. Each percept has a certain lifetime which provides information about how long the percept has already been in the percept memory. In addition to the current lifetime, each percept in the percept memory has a lifespan which, when it is exceeded, signals to the memory that the percept needs to be removed from the memory. Since the components now interact with the knowledge base for a percept request, they can indicate to the knowledge base and hence the percept memory how old the requested information can be. If the information within the percept memory is below this limit, the percept memory can return the desired information directly to the respective component. Should the information be too old or the percept's lifespan have been exceeded, the percept memory can start a new percept request to the game. This caching mechanism thus allows a programmer of a component to make the agent more human by virtue of its not always being based on current information from the game but rather also sometimes being subject to misinformation if it allows a certain age of information.

Another application scenario is the division of behaviors into knowledge-building and knowledge-requesting behaviors. It is thus possible to write a behavior which writes knowledge to the percept memory when it sees new objects, for example. On the other hand, it is possible to write behaviors which use precisely this knowledge, regardless of how old it is, and do not send new percept requests to the game if the information is not present.

4. FLOW OF DATA

The flow of control in the agent is both data-controlled and goal-controlled. The arrival of percepts results in an alteration to the local or global world model. In response to alterations to the world model, different behavior patterns are activated, terminated or implemented. The implementation of a behavior pattern is initiated by the local planning level and the cooperation level, the planning level being responsible for producing new separate plans and, as a result, new cross-agent plans, in order to achieve the agent's goals again. This finally results in execution of actions and in production of messages (speech acts).

Goals are prescribed by the components within an agent, either statically from a file or dynamically in response to an environmental change. These goals initiate a flow of data. This flow of data can be visualized within the AI engine. There are various flows of data which can proceed within the AI engine. These are firstly actions which are sent, including the speech acts packed in them. There are also events which can be produced by the game, inter alia as the cause of an action which has previously been sent to the game. In addition, the agent can make percept requests to the game which the game answers at a later time. The precise profile of these flows of data will be illustrated below.

Figure 3:
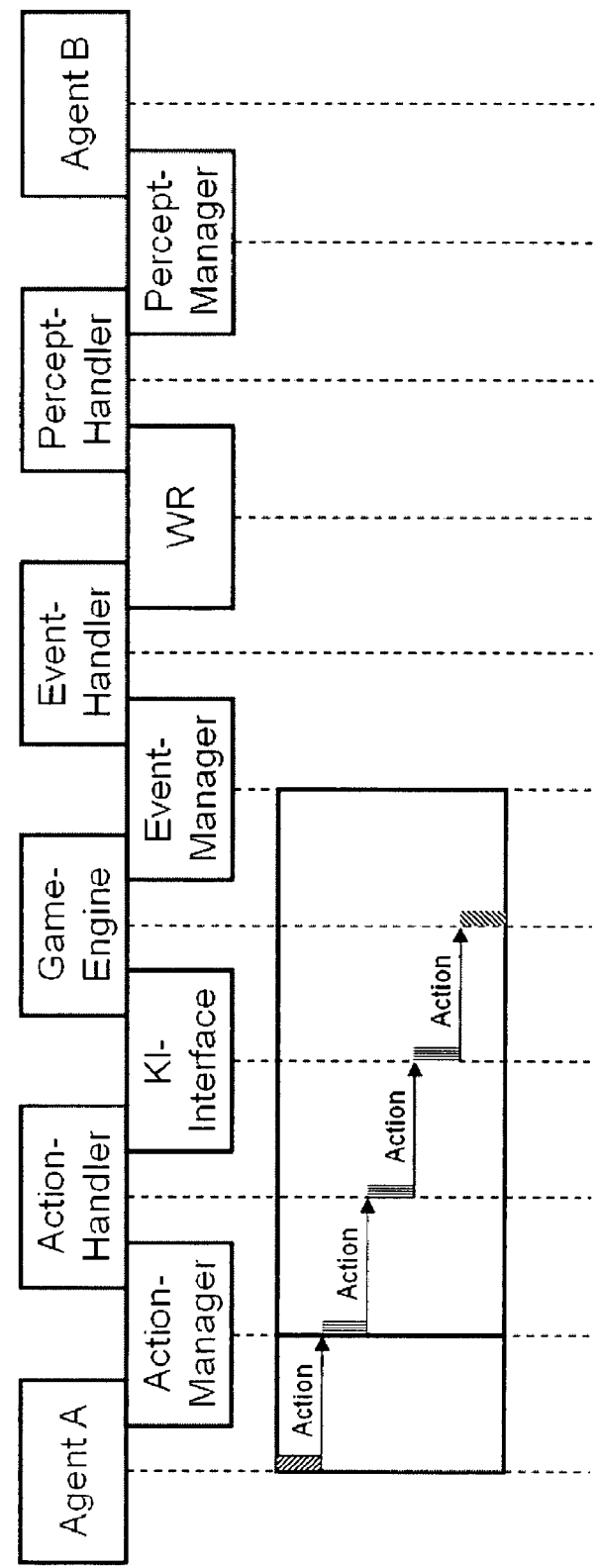
FIG. 3 shows a schematic illustration of the flow when an action is sent to the game.

To illustrate the flow of data, we will use a modified interaction diagram (see FIG. 3). This diagram has time on the vertical axis. The horizontal axis shows the individual components which participate in the flow of data. In addition to the normal marking that work is done in this component, the blocks are marked with different shading, where:

- a  block marks the start of the life of an action/event/percept,
- a  block marks a processing step for the action/event/percept,
- a  block marks the end of the life of an action/event/percept, and where
- a  block signals additional information requests.

Another change is the roundup of a plurality of data flow steps using a thick border. This symbolizes that this sequence of steps can no longer be disjointed externally; the flow of data can be isolated only at points at which a new border starts. If the first processing step is started within a border, all the steps are processed until the border merges into a new border. When two different borders merge, a very large time delay may arise as a result of isolation which is possible here, depending on whether the AI engine is optimized for multi-threads or single threads. To be more precise, the flow of data is stopped at the junctions, i.e. by a queue and can be continued later.

4.1 Send Actions to Game

Actions are sent to the game by the agent so that they alter the state of the agent. In FIG. 3, we can see the components through which an action passes before it has gone from agent A to the game engine. The progression can be described as follows:

a) The agent A creates an action, either directly in a component or using the ActionCreator and sends it to the action manager in the world server.

b) When processing control is handed to the action manager, the action manager executes the appropriate action handler on the action.

c) The action handler performs appropriate conversion of the data in the action so that the game can interpret the action correctly (e.g. object ID conversion) and sends the action through the AI interface to the game engine.

d) In the AI interface, the AI object IDs of an action are converted to the game object ID.

e) The game engine receives the action in a callback function and implements the action in a game, or defers it until a later time.

4.2 Send Speech Acts from One Agent to the Other

Figure 4:
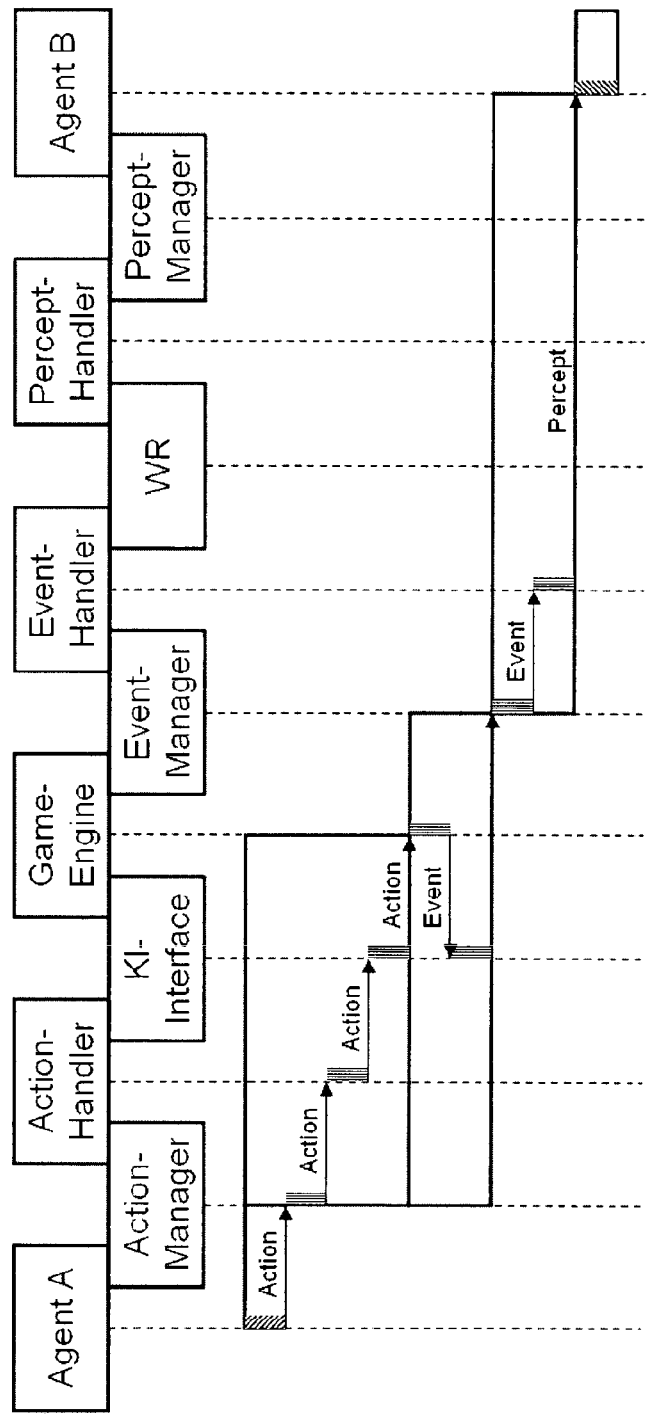
FIG. 4 shows a schematic illustration of the flow when a speech act is sent from agent A to agent B.

So that an agent can send a speech act to another agent, it needs to encapsulate this speech act in an action and send it to the game. The game then has the task of sending this speech act to the AI engine again. This mechanism has the advantage that the game logic has full control of the communication between the agents. It can therefore incorporate errors into the communication protocol or suppress the communication completely, for example, if the game logic prescribes that an agent is sometimes deaf, or the radio within a certain area is subject to interference. The data proceed as shown schematically in FIG. 4:

a) Agent A creates a speech act which it encapsulates in an action, and sends it to the action manager.

b) When the action manager obtains processing control, it takes all the actions from its queue and executes the appropriate action handler on the action for each action.

c) The action handler converts the receiver and sender IDs of the speech act and forwards the action to the game via the AI interface.

d) The AI interface converts the AI sender ID of the action to an appropriate object ID for the game.

e) In the game, the action is parsed in a callback function, and the speech act is encapsulated in an event and is sent back to the AI interface. Alternatively the speech act is rejected. Sending back as an event can also be delayed by the game engine, e.g. if an agent is sending too many messages.

f) The AI interface converts the sender ID of the event and forwards the event to the event manager.

g) When the event manager obtains processing control, it processes its queue and calls the appropriate event handler for the speech act event.

h) The event handler converts the event to a percept and sends it to the agent B, which is cited as the receiver in the speech act. Additionally this agent needs to have registered with the event handler for speech acts, otherwise the speech act is rejected.
  i) In agent B, the percept is forwarded to the communication component, which then takes the speech act from the percept.

4.3 Send an Event from the Game to the AI Engine

Figure 5:
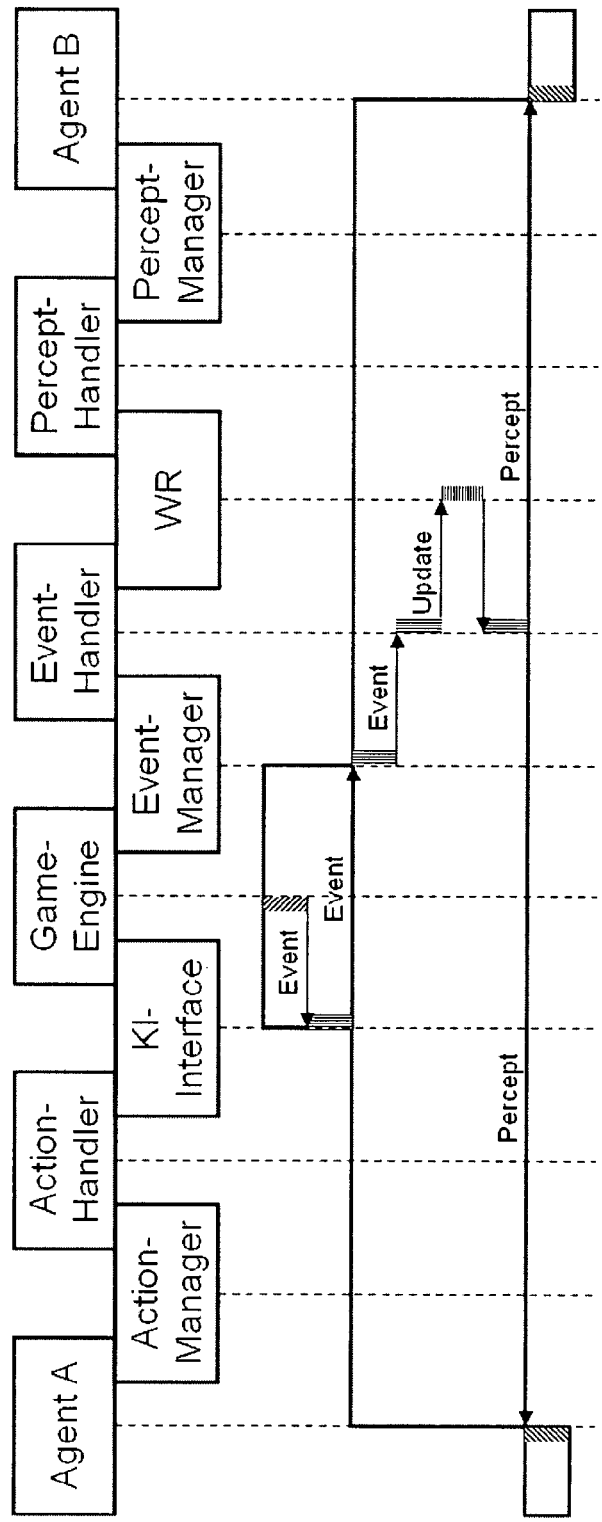
FIG. 5 shows a schematic illustration of the flow when an event is sent from the game to a plurality of agents in the AI engine.

During the game progression, events are initiated continually. These may firstly be sounds or events which are initiated by the game logic, such as the start of a round. Events are normally output visually on the monitor, in the form of text or images, or in the form of a sound. These events are sent as events to the AI engine, so that the agents can likewise interpret the game progression correctly. When the game sends an event to the AI engine, the event reaches the agents as shown schematically in FIG. 5:

a) The game creates an event struct for the relevant event and passes it to the AI interface.
  b) The AI interface converts the sender ID of the event and forwards the event to the event manager.
  c) When processing control is handed to the event manager, it calls the appropriate event handler for each event in the queue.
  d) Depending on which event handler is executed, it may arise that an update is performed in the world representation. This step is optional, however. After the world representation has received an update, a percept is produced from the event. This percept can now contain more information than the event. In the case of a sound event, the update can propagate the sound through the world in the world representation. The percept which is sent to the agents then additionally also contains the volume of the sound source, or they do not receive the percept at all if they can no longer perceive the sound. The percepts produced are then sent to the agents.
  e) The agent receives the percept and forwards it, when it has processing control, to the relevant component.

4.4 Percept Request to the Game (Pull)—Case 1

If an agent wishes to request information about its environment, it needs to start a percept request. The request is always started in the agent when it sends an empty percept to the world server which the world server then needs to fill. The rest of the flow of data can be divided into three cases, depending on how current the information needs to be and which percept handler provides the information.

Figure 6:
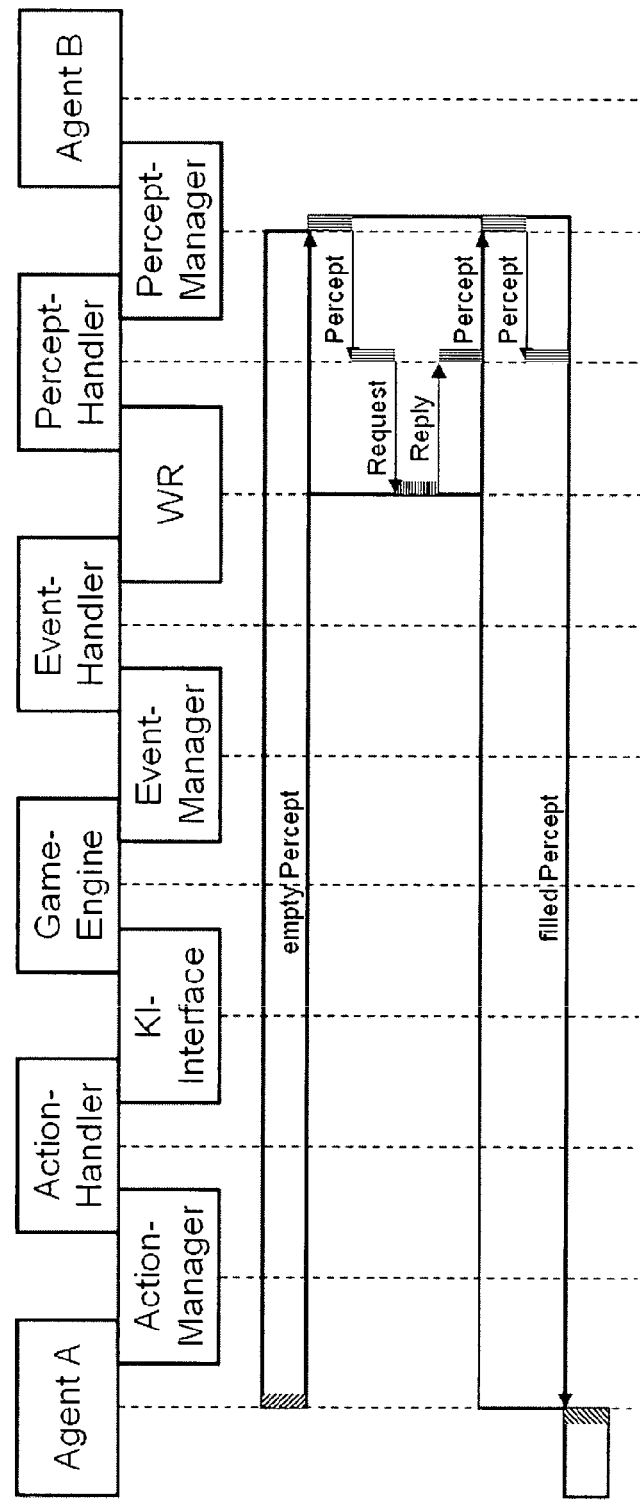
FIG. 6 shows a schematic illustration of the progression when a percept request is made by agent A which can be met by the cache in the world representation.

In the first case, a percept handler is used which uses the world representation as a cache for the information sought in the percept. In addition, the information in the world representation is valid in this case. The flow of data then proceeds as shown schematically in FIG. 6:

a) Agent A creates an empty percept and sends it via the world server to the percept manager.
  b) The percept manager is now provided with processing control for the step FetchData. It forwards the empty percept to the percept handler by carrying out the method FetchData with the percept handler too.
  c) The percept handler now makes a request to the world representation for the required data in the percept. In this context, the data stored in the world representation must not exceed a certain age.
  d) The world representation returns valid data in this case (reply).
  e) The percept handler has now collected all the information. Since the data in the world representation correspond to the requested data in the percept (AI internal data), these data are written to the percept right away. The percept handler has then terminated the step FetchData and returns the percept to the percept manager.
  f) When the percept manager is subsequently provided with processing control for the step ProcessData, it executes the percept handler using the method ProcessData.
  g) The percept handler now has the opportunity to postprocess the previously stored data in the percept. When it has done this, it sends the filled percept back to the agent A.
  h) When the agent A has been allocated processing time, it takes the percept from its InQueue and sends it to the component which sent the request previously.

4.5 Percept Request to the Game (Pull)—Case 2

Figure 7:
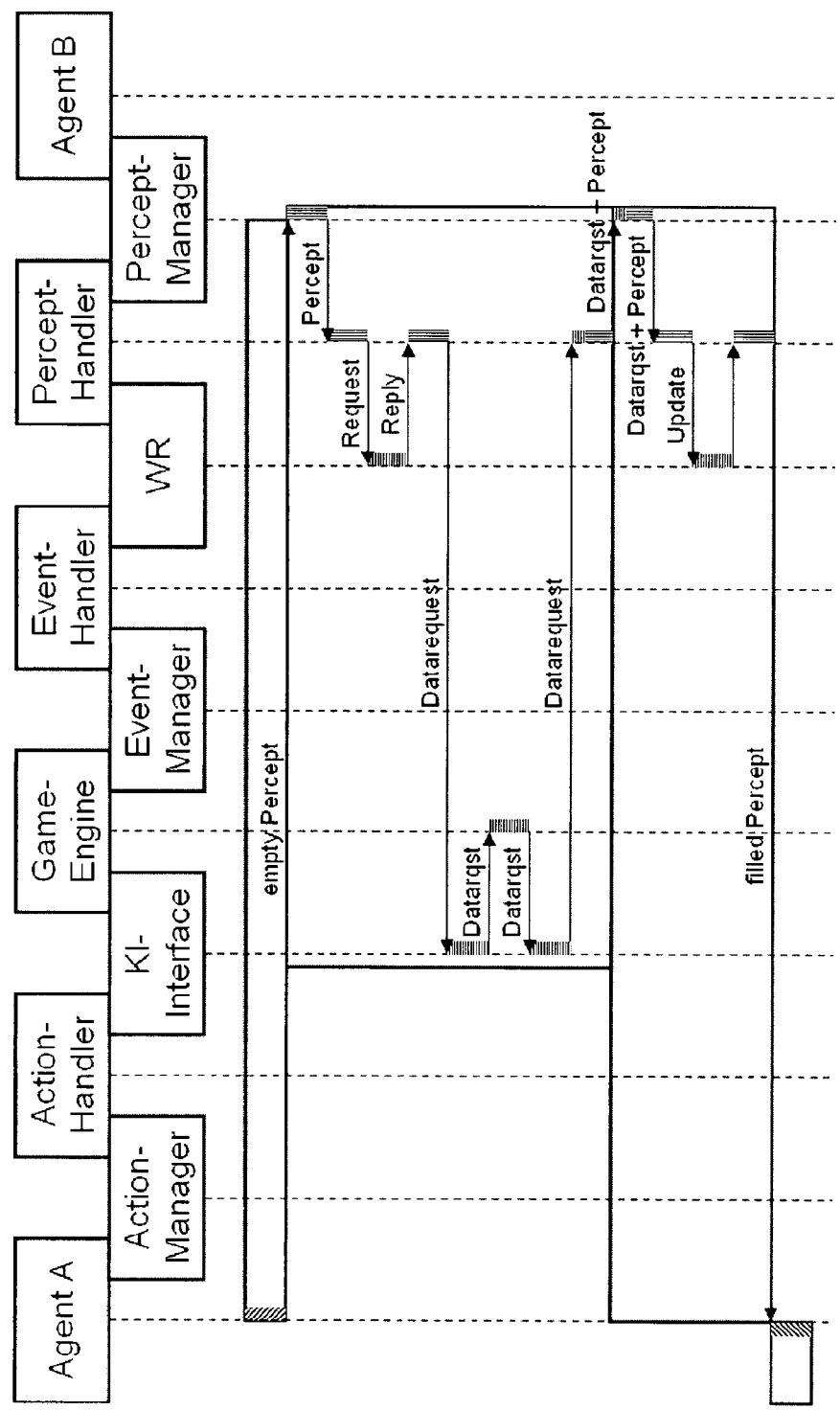
FIG. 7 shows a schematic illustration of the progression when a percept request is made by agent A, where the information in the world representation is not current enough and a request needs to be made to the game.

The second case differs from the first case in that the world representation cannot return valid data in point d) in Case 1. The progression accordingly changes as shown schematically in FIG. 7:

a) The percept handler is not provided with any valid data by the world representation and therefore makes a request (data request) to the game engine via the AI interface.
  b) The game engine fills the data request with the requested data and returns the data request to the percept handler via the AI interface.
  c) The percept handler has now collected all the necessary information and returns the percept together with the data request to the percept manager. The percept manager performs no processing steps on the data request, since it is in the step FetchData.
  d) If the percept manager is then provided with processing control for the step ProcessData at some time, it executes the method ProcessData with the percept handler and in so doing transfers the percept and the previously collected data in the form of the data requests.
  e) The percept handler now processes the data from the data request and thereby fills the percept. In addition, it performs an update for the world representation so that it has current information from the world representation again the next time. It then returns the filled percept to the agent.
  f) When the agent A has been allocated processing time, it takes the percept from its InQueue and sends it to the component which sent the request previously.

4.6 Percept Request to the Game (Pull)—Case 3

Figure 8:
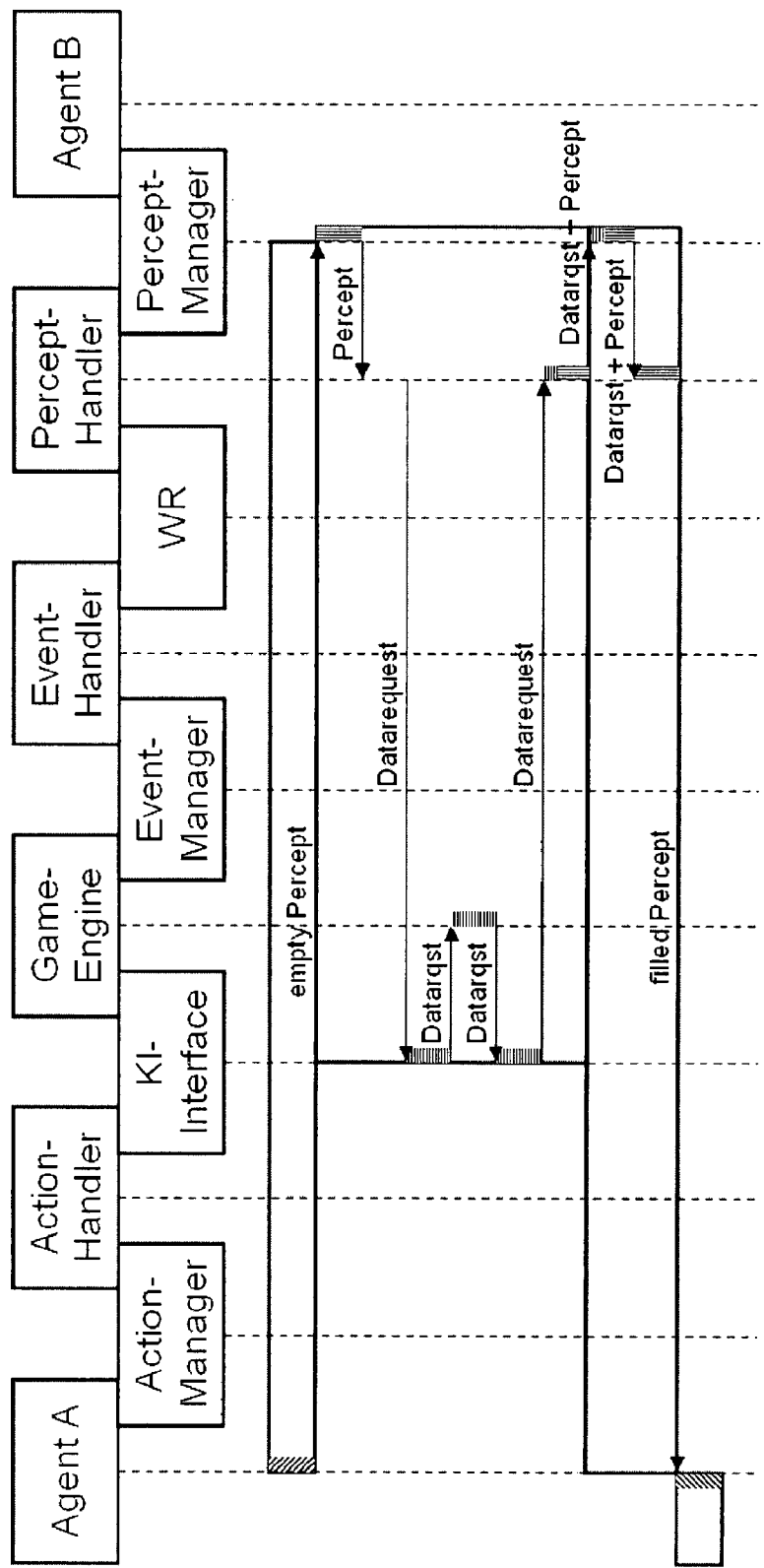
FIG. 8 shows a schematic illustration of the progression when a percept request is made by agent A, when the requested data always need to be current enough for it not to be worth buffer-storing data in the world representation.

The third case arises when the requested data always need to be so current (e.g. the current position of the agent for navigation) that it is not worth buffer storing data in the world representation. The request and the update for the world representation are therefore dispensed with completely in this step. The flow of data then proceeds as shown schematically in FIG. 8:

a) Agent A creates an empty percept and sends it via the world server to the percept manager.
  b) The percept manager is now provided with processing control for the step FetchData. It forwards the empty percept to the percept handler by carrying out the method FetchData with the percept handler too.
  c) The percept handler makes a request (data request) to the game engine via the AI interface directly.
  d) The game engine fills the data request with the requested data and returns the data request via the AI interface to the percept handler.
  e) The percept handler has now collected all the necessary information and returns the percept together with the data request to the percept manager. It does not perform any processing steps on the data request, since it is the step FetchData.

f) If the percept manager is then provided with processing control for the step ProcessData at some time, it executes the method ProcessData with the percept handler and in so doing transfers the percept and the previously collected data in the form of the data requests.
g) The percept handler now processes the data from the data request and in so doing fills the percept. It then returns the filled percept to the agent.
h) When the agent A has been allocated processing time, it takes the percept from its InQueue and sends it to the component which sent the request previously.

5. PROCESSING TIME CONTROL

The processing time control within the AI engine distributes the available processing time to the various components. To this end, the world server distributes the available processing time to the various managers and to the agents. In addition, each agent has rudimentary processing control for its internal components. We therefore distinguish between the global processing time control and the local processing time control within the agents.

5.1 Global Processing Time Control

The global processing time control distributes the processing time to primary components, such as the managers within the world server and the individual agents. To meet the rising level of parallelization of processing operations, we have two different models for the processing time control. One model is designed for use in single-threaded applications and the other is designed for use in multi-threaded applications so that a possibly available second CPU core can be used.

5.1.1 Single-thread Environment

At the beginning we saw that every manager within the world server is equipped with input queues, as are individual agents. In a single-threaded application, it makes no difference to the total delay produced by the AI engine in what order we hand processing control to the components. We always need to execute all the components so that a correct flow of data is obtained. We therefore wish to distribute the processing time such that the latencies between actions and effects are minimized.

Figure 9:
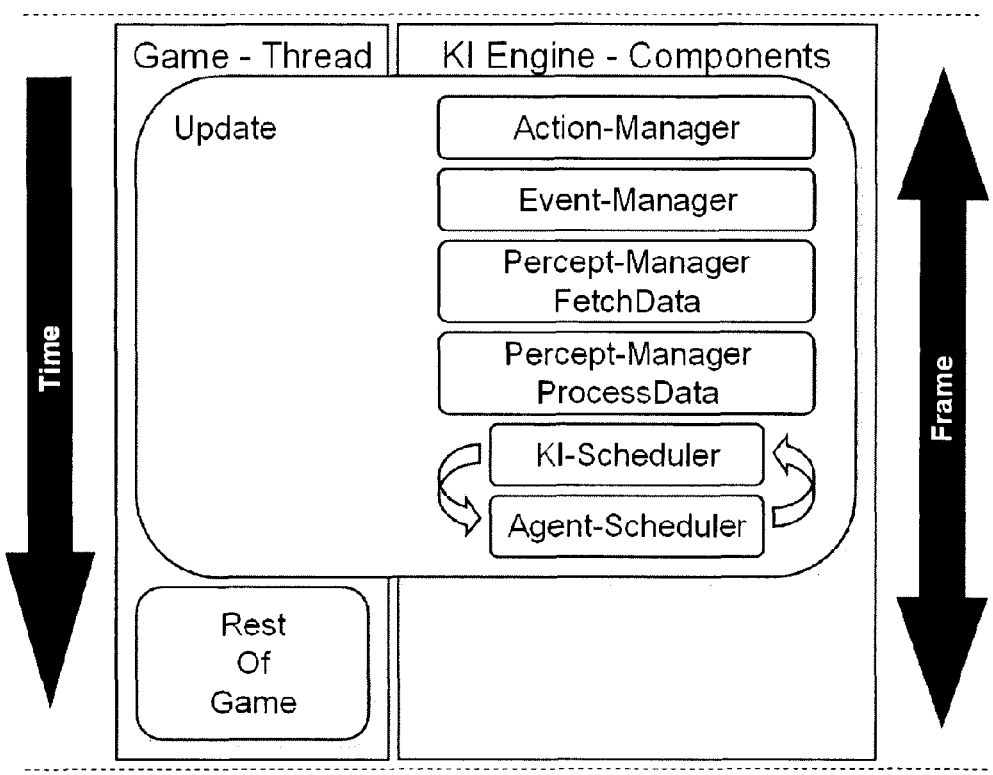
FIG. 9 shows a schematic illustration of the AI engine in a single-thread environment.

The dependencies between actions, events and percepts (e.g. actions may contain speech acts and are then events) produce the processing time distribution as shown in FIG. 9. The game calls the update method from the AI interface. In this method, the various components of the AI engine are then executed in the following order:

1. Action manager: The action manager sends all the actions it has received to the game via the action handler.
2. Event manager: The event manager forwards events it has received to the agents. Since we have already executed the action manager before the event manager, the events also include speech acts which have first been sent to the game in this frame.
3. Percept manager FetchData: The percept manager performs the FetchData step with the respective percept handlers for all percepts it has received.
4. Percept manager ProcessData: Since we are in a single-threaded application, the next step executed for all percepts in the percept manager is the ProcessData step. Hence, the percepts have then been processed.
5. AI scheduler+agent scheduler: Next, there is an iterated change between the AI scheduler, which allocates processing time to an entire agent, and the agent scheduler, which allocates processing time to the individual components within an agent. First, the AI scheduler is provided with the remaining time from the AI engine and distributes it to the individual agents. In this case, all agents may be provided with processing time or just some if too little processing time is available. A round-robin method then means that the other agents are provided with processing time in the next frame. The agent scheduler distributes the total time for an agent over the three primary components in the agent.

The full AI is thus executed in the game thread.

5.1.2 Multi-Thread Environment

In modern processing systems, it is possible to identify a pronounced trend toward parallelization of the processing. The AI engine has therefore been designed such that it is also capable of processing threads in parallel with the actual game. For multi-threading, it is not possible to manage without synchronizing the various threads. So that the synchronization loses as little processing time as possible, the components are called in an order which differs from that of single-threaded applications so that the calculations during the synchronization are minimized to the pure data interchange.

Figure 10:
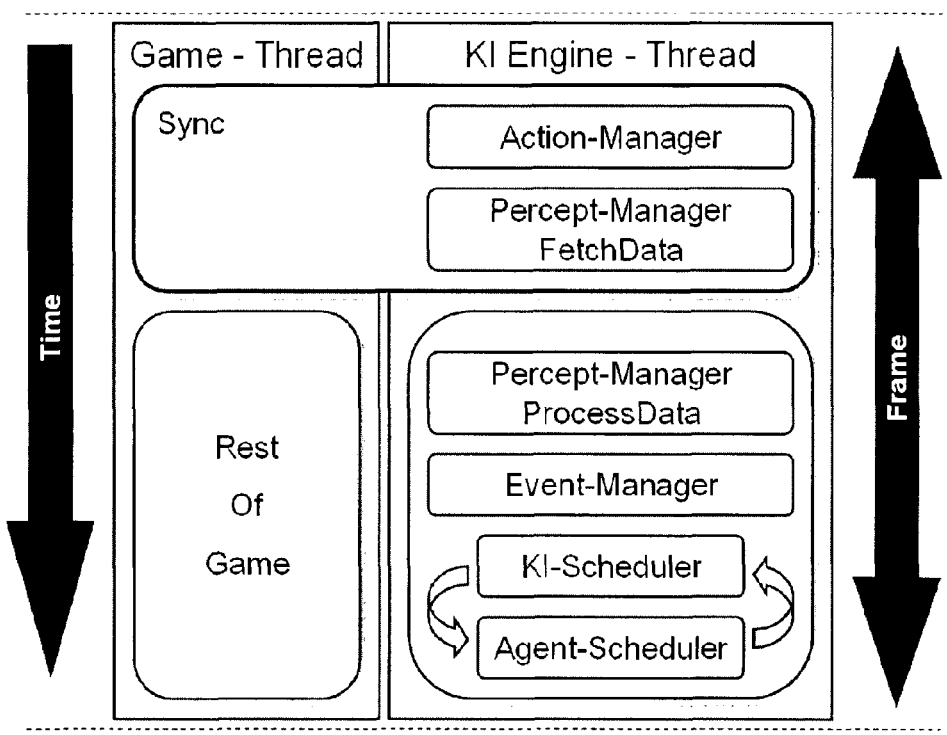
FIG. 10 shows a schematic illustration of the AI engine in a multi-thread environment.

In FIG. 10 it is possible to see the update profile for the AI engine in a multi-thread application. The game executes the sync (update) function of the AI engine via the AI interface. This sync method now waits until the AI thread has completed its calculations for a frame. By executing the action manager, the actions stored in the action manager are then sent to the game. Next, the sync method also executes the FetchData step with the percept manager so that requests from the agents to the game can be met. This means that all data are sent to the game or are removed from the game. The two threads can now be isolated and go separate ways to the next frame when the game thread performs the sync method of the AI interface again.

Thus, only the synchronization of the game thread is performed, while the rest of the calculation is performed in an extra AI thread.

In the AI thread, the remaining components are now also provided with processing time. None of these components requires direct access to the game, which for its part performs calculations for presenting the game. The AI thread executes all the updates and also, as in the single-thread application, allocates processing time to the individual agents. When all processing time has been used up, the AI thread waits until the game performs a sync again.

The AI thread is allocated processing time, as in the single-thread application. The effect of this is that the game continues to have control over the AI engine. Should the AI thread not be allocated correct processing power by the operation system, for example, because the game is running on a single-core CPU or a CPU with hyperthreading, it must nevertheless be possible for the AI to be provided with sufficient processing time. If the AI engine were to calculate only up until the game thread performs a sync again, it may be that the AI engine has still not performed any calculations. The allocated processing time in the sync method therefore ensures that the AI engine is provided with a minimum of processing time. The game thread needs to wait for the AI thread; this means that all the CPU's processing power is available to the AI thread.

Since further events may arise during the state calculation in the game, the InQueue of the event manager has been programmed on a threadsafe basis. Thus, while the game thread and the AI thread go separate ways, the game thread can now send events to the AI engine without generating an error.

5.2 Local Processing Time Control

The local processing time control relates to individual agents. Each agent has its own small processing time control.

Within the agent there are two components which are responsible for the distribution of processing time. These are firstly the component scheduler and secondly the scheduler FSM.

5.2.1 Component Scheduler

Since we have only three different components (Cooperation, Local Planning, Reactive Level) in the agent, the component scheduler can work with a static number of objects. Each component has a priority which is used to stipulate whether a component is provided with a lot of or little processing time. In this case, the priority is dependent on the situation which the agent is currently in. If the agent is currently in a planning phase, the planning level is provided with more processing time than the reactive and cooperation levels. If the agent is being bombarded during the planning, however, the reactive level must abruptly be allocated more processing time. This task is performed by the scheduler FSM.

5.2.2 Scheduler FSM

The scheduler FSM (Finite State Machine) is a simple state machine having predefined states. These states describe frequent thought states such as:

Neutral: The agent is in a neutral state. This occurs when there is no threat and the agent is simply going from A to B.

Think: The agent requires additional thought. This is the case when he is elaborating a new plan.

Panic: This state arises when the agent is in a threatening situation, e.g. when he is under fire.

Communicate: This state describes the agent when he is communicating.

For each of these states, the designer can stipulate which priorities the components in the agent receive. If a state change now occurs, the scheduler FSM sets the new priorities for this state on the agent scheduler. In the "panic" state, the reactive level could be given the greatest priority, for example. The reactive level is thus provided with an excessively large amount of processing time, and the agent can therefore escape the threat.

The individual states are changed directly by the respective components. To prevent the components from disputing the processing time with one another, the respective states are allocated priorities. This priority should not be confused with the priorities which are allocated to the respective components in the agent in a state. The scheduler FSM can only ever change from a lower-priority state to a higher-priority state. Only the component which has chosen the higher state can reset it to the normal state again.

LIST OF CITED LITERATURE

[JPM99]: Jörg P. Müller: "The Design Of Intelligent Agents. A Layered Approach", Springer Verlag, Berlin (February 1999)

The invention claimed is:

1. A processing unit for implementing a multi-agent system having:
   a) means for implementing a first level, which represents a system;
   b) means for implementing a second level, which has an abstract representation, reduced to concepts, of the system from the first level;
   c) means for implementing a third level, which has means for implementing the agents in a multi-agent system;
   d) an interface for communication between the first and the second level; and having
   e) an interface for communication between the second and the third level.

2. The processing unit as claimed in claim 1, wherein:
   the interface for communication between the first and the second level has a structure which corresponds to the structure of an interface between the first level and a human user.

3. The processing unit as claimed in claim 1 wherein:
   the interface for communication between the second level and the third level is effected by means of actions and percepts.

4. The processing unit as claimed in claim 3 wherein:
   an agent has at least one associated prescribed virtual sensor; and
   in that the percepts for this agent are filtered on the basis of the respective sensors for this agent.

5. A processing unit for implementing a multi-agent system:
   a) where a first level contains a system;
   the processing unit having the following:
   b) means for implementing a second level, which has an abstract representation, reduced to concepts, of the system from the first level;
   c) means for implementing a third level, which has means for implementing the agents in the multi-agent system;
   d) an interface for communication between the first and the second level; and having
   e) an interface for communication between the second and the third level.

6. A simulator for a multi-agent system having:
   a) means for implementing a first level, which represents a system;
   b) means for implementing a second level, which has an abstract representation, reduced to concepts, of the system from the first level;
   c) means for implementing a third level, which has means for implementing the agents in the multi-agent system;
   d) an interface for communication between the first and the second level; and having
   e) an interface for communication between the second and the third level.

7. An architecture for a computer program for implementing a multi-agent system, having:
   a) a first level, which represents a system;
   b) a second level, which has an abstract representation, reduced to concepts, of the system from the first level;
   c) a third level, which has means for implementing the agents in the multi-agent system;
   d) an interface for communication between the first and the second level; and having
   e) an interface for communication between the second and the third level.

8. An architecture for a computer program for implementing a multi-agent system, where:
   a) a first level contains a system;
   the architecture having the following:
   b) a second level, which has an abstract representation, reduced to concepts, of the system from the first level;
   c) a third level, which has means for implementing the agents in the multi-agent system;
   d) an interface for communication between the first and the second level; and having
   e) an interface for communication between the second and the third level.

9. A piece of middleware for developing a computer program for implementing a multi-agent system:
   a) where the computer program simulates a system in a first level;

b) where the middleware has a second level, which has an abstract representation, reduced to concepts, of the system from the first level;
c) where the middleware has a third level, which has means for implementing the agents in the multi-agent system;
d) where the middleware has an interface for communication between the first and the second level; and
e) where the middleware has an interface for communication between the second and the third level.

10. A method for implementing a multi-agent system:
a) where a first level is simulated which represents a system;
b) where a second level is simulated which has an abstract representation, reduced to concepts, of the system from the first level;
c) where a third level is simulated which has means for implementing the agents in the multi-agent system;
d) where information is interchanged between the first and the second level; and
e) where information is interchanged between the second and the third level.

11. A computer program, characterized in that when it is executed on a processing unit, a microcontroller, DSP, FPGA or computer or on a plurality thereof in a network it executes the method as claimed in claim 10.

12. A computer program having program code means in order to carry out a method as claimed in claim claim 10 when the computer program is executed on a processing unit, a microcontroller, DSP, FPGA or computer or on a plurality thereof in a network.

13. A computer program having program code means as claimed in claim 12 which are stored on a computer-readable data storage medium.

14. A data storage medium storing a data structure which, after being loaded into a user and/or main memory of a processing unit, a microcontroller, DSP, FPGA or computer or a plurality thereof in a network, executes the method as claimed in claim 10.

15. A computer program product having program code means stored on a machine-readable storage medium in order to carry out all the steps as claimed in claim 10 when the program is executed on a processing unit, a microcontroller, DSP, FPGA or computer or on a plurality thereof in a network.

16. A modulated data signal which contains instructions for executing a method as claimed in claim 10 which can be executed by a processing unit, a microcontroller, DSP, FPGA or computer or by a plurality thereof in a network.

* * * * *